United States Patent [19]
Hsieh

[11] Patent Number: 5,994,879
[45] Date of Patent: Nov. 30, 1999

[54] CHARGING CIRCUIT

[75] Inventor: Wen-Ming Hsieh, Yung Kang, Taiwan

[73] Assignee: Ma Lien Electrical Engineering Co., Ltd., Tainan Hsien, Taiwan

[21] Appl. No.: 09/259,312

[22] Filed: Mar. 1, 1999

[51] Int. Cl.[6] ..................................... H01M 10/46
[52] U.S. Cl. ..................... 320/134; 320/136; 320/165
[58] Field of Search ..................... 320/118, 128, 320/132, 134, 135, 136, 139, 141, 158, 163, 165, FOR 129, FOR 138, FOR 142, FOR 147

[56] References Cited

U.S. PATENT DOCUMENTS 5,172,044  12/1992  Sasaki et al. ........................ 320/160
5,663,629   9/1997  Hinohara ..................... 320/DIG. 21 X
5,870,025   2/1999  Hinohara ..................... 320/DIG. 21 X
5,900,717   5/1999  Lee .................................... 320/150

*Primary Examiner*—Edward H. Tso
*Attorney, Agent, or Firm*—Rosenberg, Klein & Lee

[57] ABSTRACT

A charging circuit includes a programable CPU for supplying a constant voltage and a constant current respectively to a voltage control circuit and a current control circuit so as to obtain function of automatically adjust the charging voltage and fix the current. A voltage checking circuit is provided to coordinate with the CPU for keeping watch of charging operation and checking if a battery being charged is normal or not. If the stored electric volume is less than a quarter (indicating the battery is damaged), if the positive and the negative of the charging circuit are connected reversely with those of the battery, if pinchers of the charging circuit contact each other in a short-circuited condition, or if the pinchers fall off the poles of the battery, the CPU stops at once charging operation so as to protect the charging circuit and batteries.

5 Claims, 6 Drawing Sheets

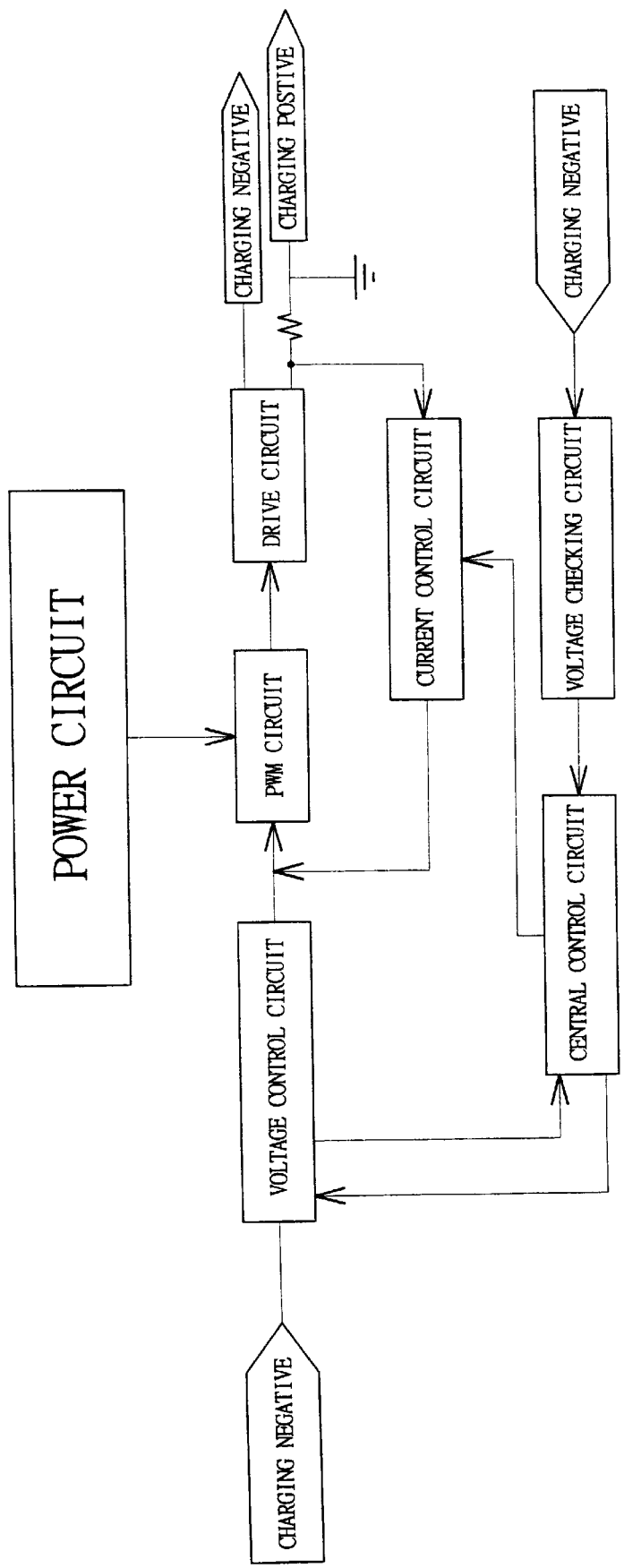
F I G. 1

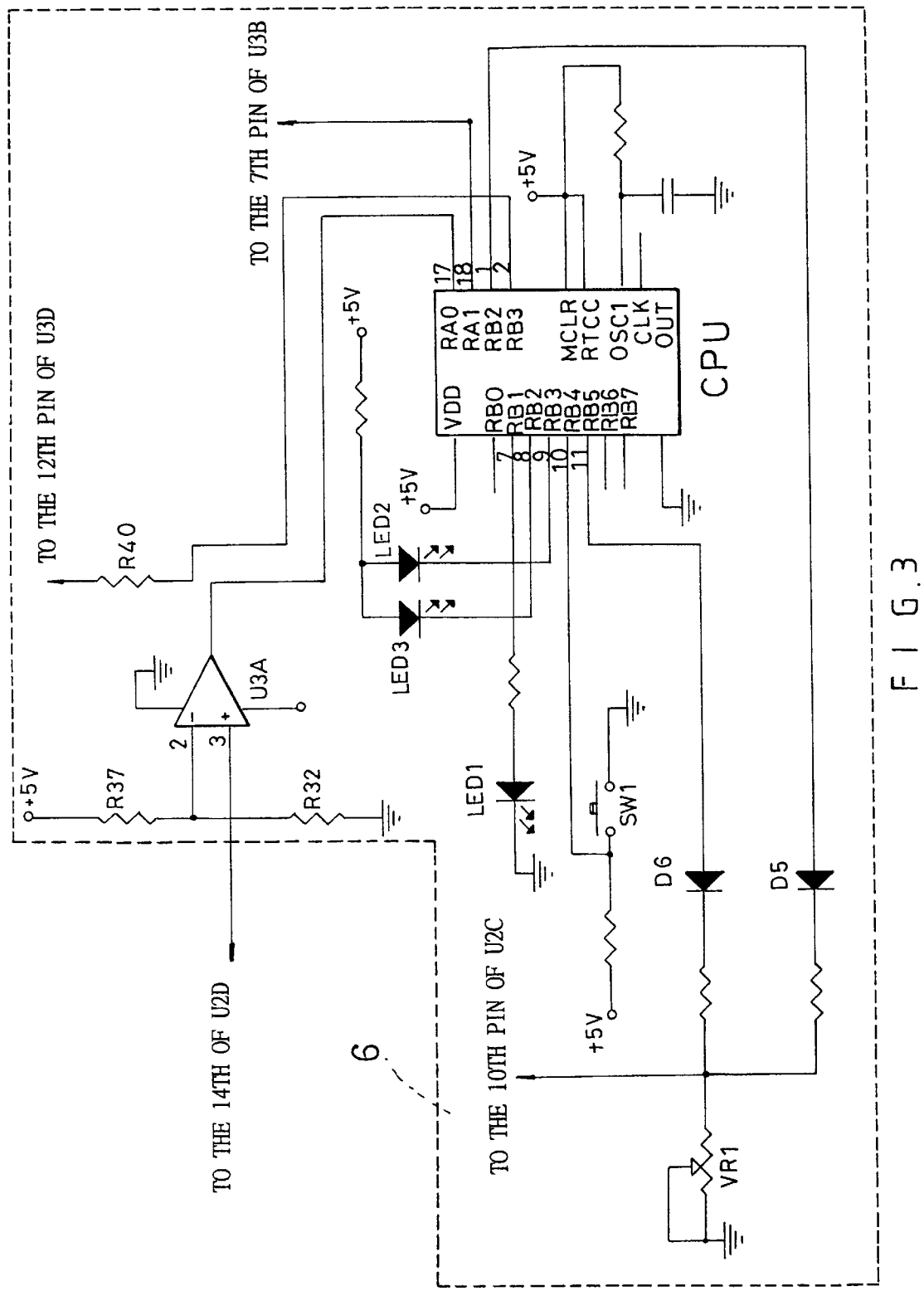
F I G. 3

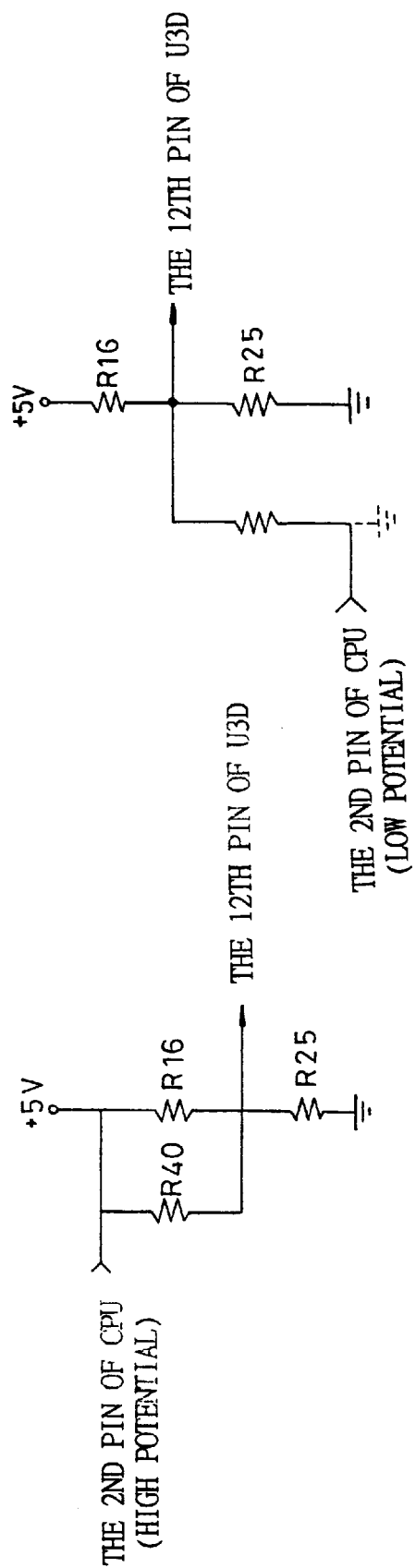

| STATE OF CHARGING | 7TH PIN OF OP AMP U3B | JUDGEMENT OF CPU | ACTION OF CPU |
|---|---|---|---|
| CHARGE PINCHER CONNECTED REVERSELY | LOW POTENTIAL | ABNORMAL | STOP CHARGING |
| CHARGE PINCHER REMOVED | LOW POTENTIAL | ABNORMAL | |
| CHARGE PINCHER SHORT-CIRCUITED | LOW POTENTIAL | ABNORMAL | |
| CHARGE PINCHER FALLING OFF WHEN CHARGING | PULSE | ABNORMAL | |
| CHARGE PINCHER PINCHING TIGHTLY CORRECT POLES | HIGH POTENTIAL | NORMAL | START OR KEEP ON CHARGING |

FIG. 7

CHARGING CIRCUIT

BACKGROUND OF THE INVENTION

This invention relates to a charging circuit, particularly to one including a CPU is simple to operate and protects its own circuit and a battery being charged.

Conventional charging devices generally have a traditional circuit provided with a simple function and with a flaw of incomplete protective means, and liable to damage a battery being charged and lessen its service life.

SUMMARY

This invention has been devised to offer a charging circuit including a CPU (central processing unit), which is ready to supply proper constant voltage and current respectively to voltage control circuit and a current control circuit, for obtaining function of automatically adjusting charging voltage and constant current according to practical charging condition. The CPU can keep watch of charging operation and checking a battery in coordination with a voltage checking circuit. If stored electric volume in the batter is less than quarter (indicating the battery is already damaged), if the positive and the negative terminal of the charging circuit are connected reversely with those of the battery, if the pinchers of the positive and the negative of the charging circuit contacts each other in a short-circuited condition, or if any pincher of the positive or the negative of the charging circuit falls off the terminals of the battery, the CPU may at once stop charging operation so as to protect the charging circuit and the battery from damaged.

BRIEF DESCRIPTION OF THE DRAWINGS

This invention will be better understood by reference to the accompanying drawings, wherein:

FIG. 1 is a block diagram of a charging circuit of the present invention.

FIG. 3 is a diagram of a second partial circuit of the charging circuit of the present invention.

FIG. 5 is a diagram of a first operation of a current control circuit of the present invention.

FIG. 6 is a diagram of a second operationof the current control circuit of the present invention.

FIG. 7 is a table of detecting charging condition by a voltage detecting circuit of the present invention.

DETAILED DESCRIPTION OF THE PREFERRED EMBODIMENT

Figure 2:
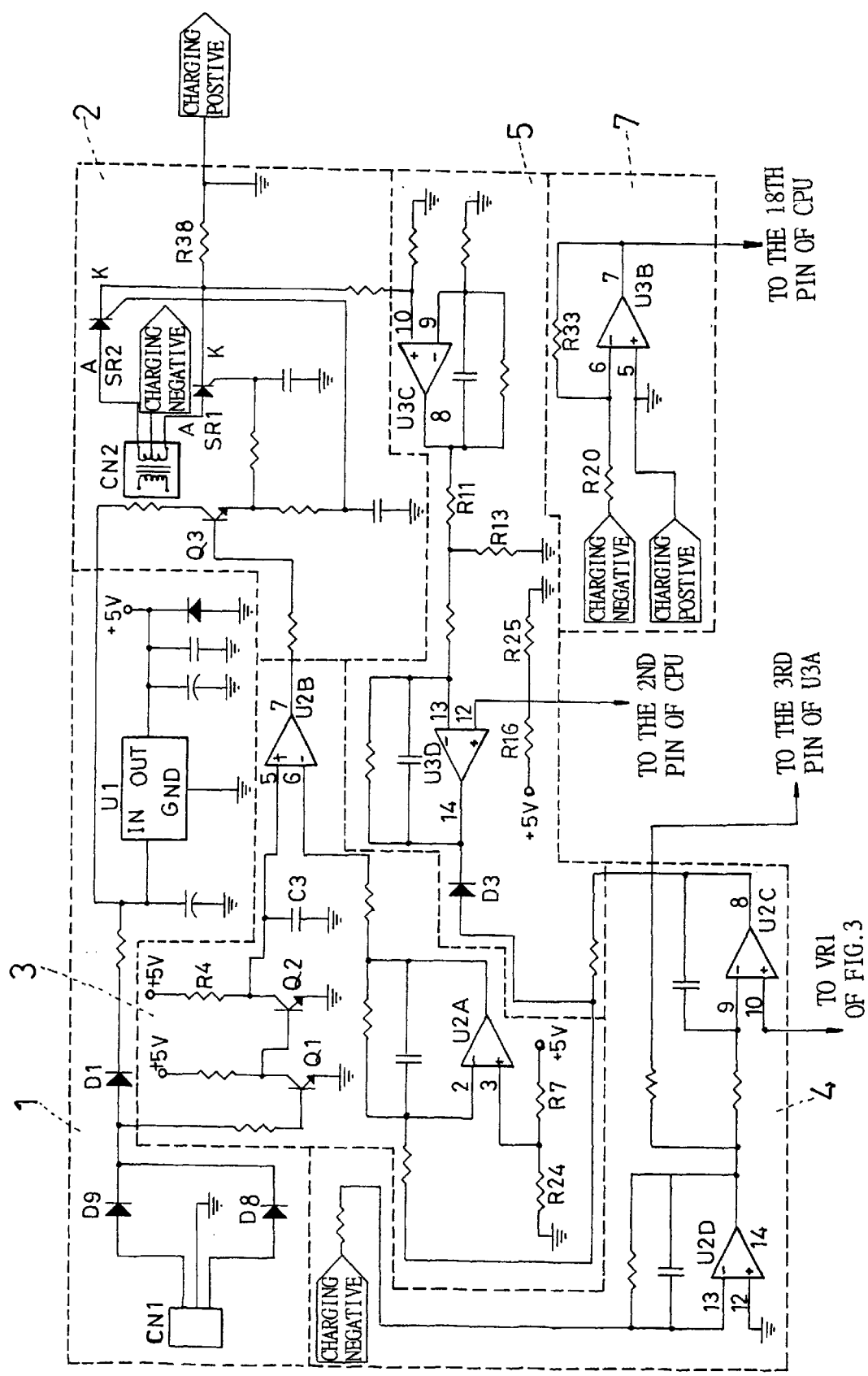
FIG. 2 is a diagram of a first partial circuit of the charging circuit of the present invention.
Figure 4:
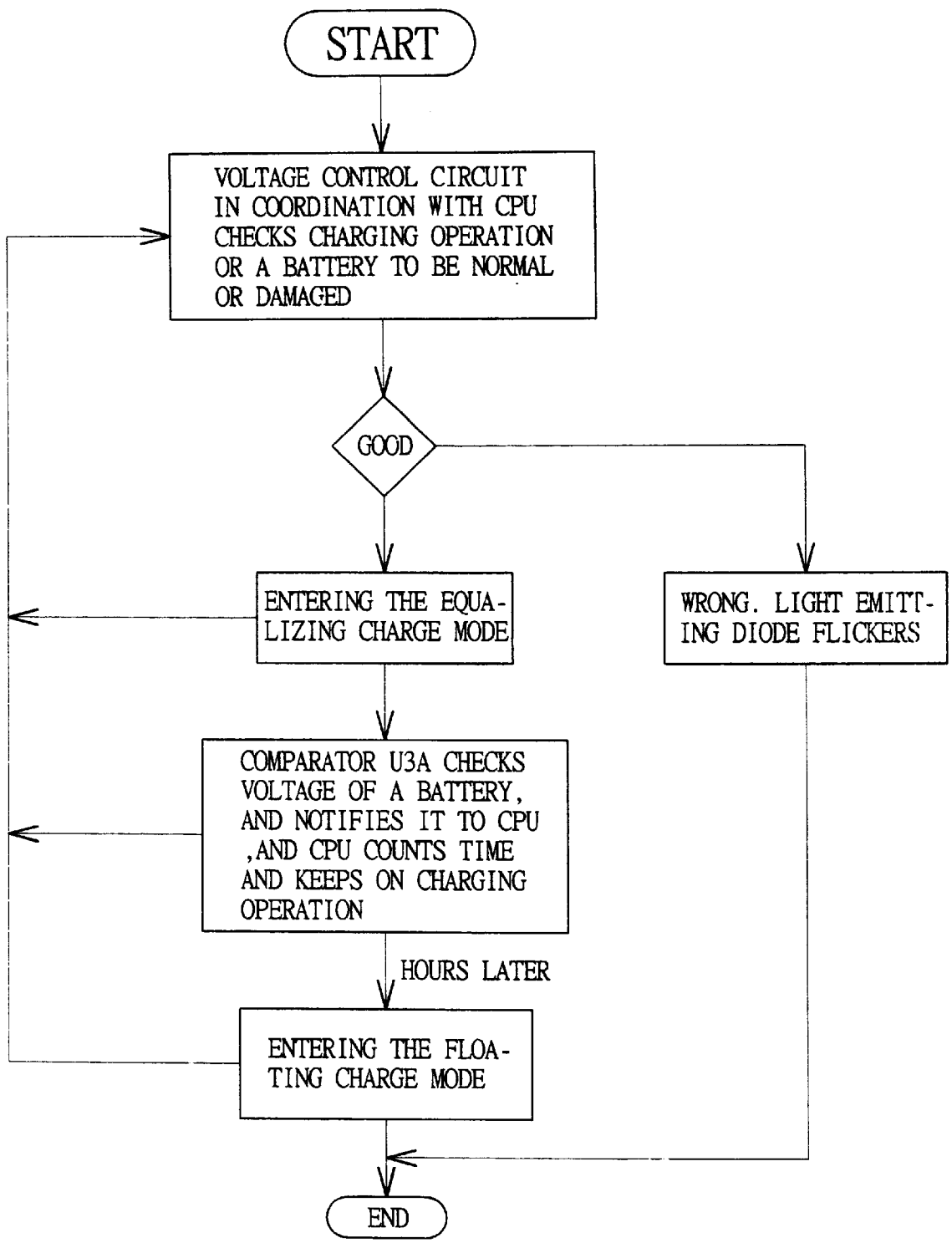
FIG. 4 is a flow chart of charging operation by the charging circuit of the present invention.

A preferred embodiment of a charging circuit of the present invention, as shown in FIGS. 1–4, includes a power circuit 1, a drive circuit 2, a PWM (pluse wide modulation) circuit 3, a voltage control circuit 4, a current control circuit 5, a central control circuit 6 and a voltage checking circuit 7 connected together.

The power circuit 1 consists of a rectifying circuit provided with a whole wave rectifier CN1 and three diodes D9, D8 and D1, a capacitor C1 as a filter, and a voltage stabilizer provided with an IC U1, for rectifying AC into DC current, filtering and stabilizing DC current for the various circuits.

The drive circuit 2 consists of a transformer CN2 having a charging negative at the central point of its coil, two outputs respectively connected to A pins of two silicon-controlled rectifiers SCR1 and SCR2, with K pins of the two rectifiers SCR1, SCR2 connected with each other and then connected to a shunt R38 as the charging positive. The start pins of the two silicon-controlled rectifiers SCR1, SCR2 are connected to the emitter of a transistor Q3, and the collector of the transistor Q3 is connected to the power circuit 1, with its base connected to the output of the PWM circuit.

The PWM circuit 3 consists of an amplifier U2A, two resistors R7 and R8 for dividing voltage, which is used as reference voltage by the amplifier U2A to amplify the output signal of the voltage control circuit 4 and to feed the amplified signal to a comparator U2B as a current level. At the same time, a standard triangular wave is put into another input of the comparator U2B, and the output pin of the comparator U2B is connected to the base of a transistor Q3. The standard triangular wave is gotten by the wave of the whole wave rectifier circuit inverted by the two transistors Q1, Q2 and then flowing through a resistor R4 and a capacitor C3, functioning the same as commercial electricity. Thus, the phase angle can be controlled accurately to trigger the silicon-controlled rectifiers SCR1 and SCR2.

The voltage control circuit 4 is for checking voltage of a battery, consisting of an OP amplifier U2D for fading voltage at the negative and feeding it to a comparator U2C for comparison with the constant voltage at its 10th pin. Then the compared value is fed to the input of the amplifier U2A of the PWM circuit for adjusting and stabilizing the output voltage of the charging circuit. If the voltage of the battery becomes higher, it is checked by the OP amplifier U2D, and the voltage level at the 14th pin also increases, and its phase is inverted at the input (the 9th pin) of the comparator U2C and compared with the constant voltage reference value at another input (the 10th pin), and then fed to the PWM circuit 3.

The current control circuit 5 consists of a differential amplifier made of an OP amplifier U3C for amplifying current of a shunt (resistor R38), and then the current is faded through two resistors R11, R13 and fed to the comparator U3D and compared with the constant current at the 12th pin. The output pin of the comparator U3D is connected with the output of the comparator U2C via a diode D3. Meanwhile, the OP amplifier U3C amplifies the current of the shunt (R38) and feeds it to the comparator U3D for comparison with the contant current. If the normal output current does not exceed the constant current, the output of the comparator is high potential, the negative of the diode D3 has higher voltage than that of the positive, so the voltage fed to the amplifier U2A by the comparator U2C is not affected. In case the current is higher than the constant current, the output of the comparator U3D is low potential, making the voltage of the positive of the diode D3 larger than that of the negative, with the diode D3 becoming ON. Then the voltage fed to the amplifier U2A by the comparator D3 becomes lower, altering charging voltage fed out so as to stabilize the constant current. The constant current at the 12th pin of the comparator U3D is controlled by the CPU, with the 12th pin connected parallel to the voltage dividing resistors R16, R25, and then to the second pin of the CPU. The constant current can be altered, so long as the voltage divided at the 12th pin of the comparator U3D is altered.

As shown in FIG.5, when the second pin the CPU is high potential (e.g.the output being +5 V), the resistors R40 and R16 are in parallel, but as shown in FIG. 6, when the second pin is low potential (e.g. grounded), the resistors R40 and R25 are in parallel. Thus, high or low potential fed out of the CPU coordinated with the voltage dividing resistors R16, R25, R40 can alter the voltage value at the 12th pin of the comparator U3D, controlling the constant current of different value.

The central control circuit 6 consists of a CPU for controlling charging operation according to an inner program with two stages of charging modes such as a first equalizing charge and a second floating charge. The output port of the CPU supplies a constant voltage to the 10th pin of the comparator U2C of the voltage control circuit 5 and a constant current to the 12th pin of the comparator U3D of the current control circuit 5. Further, the input port RA0 of the CPU is connected to the output pin of the comparator U3D. It is the equalizing charge mode at the beginning of charging operation, wherein the comparator U3D gets the voltage value of a battery from the OP amplifier U2D of the voltage control circuit 4 so as to compare with the reference voltage got from a voltage divider (resistors R37 and R32). If the voltage of the battery rises to the reference voltage, the output of the comparator U3A is high potential and the CPU keeps on charging and counts time for several hours. After several hours, the CPU alters the first equalizing charge into the second floating charge mode, lowering the constant voltage fed to the comparator U2C so as to keep the floating charge condition. In addition, a push button SW1 is connected to the input port RB4 of the CPU for selecting manually the equalizing charge mode or the floating charge mode, or a charing current value.

The voltage checking circuit 7 operates checking of the voltage value of a battery to protect the charging circuit and the battery, consisting of a phase invering amplifier of an OP amplifier U3B, which inverts the phase and amplifies voltage fed from the negative of the charging circuit. If the stored electric volume of the battery is lower than a quarter, if the positive and the negative of the charging circuit are reversely connected to those of the battery, if the pinchers of the positive and the negative of the charging circuit contact with each other in short-circuited condition, or if the pinchers fall off the terminals of the battery, the output of the phase inverting amplifier made of the OP amplifier U3B becomes lower potential, and the CPU at once stops charging operation so as to protect the charging circuit and the battery. If the charging operation is normal and the battery is regular, the output pin of the OP amplifier U3B is high potential, and the CPU keeps on normal charging operation.

Referring to FIG. 7, in checking process by the voltage checking circuit 7, the OP amplifier U3B firstly feeds voltage to the battery, and if the voltage through the 7th pin of the OP amplifier U3B exceeds the preset value (for example 2 V) and maintains a stabilized level, the 18th pin of the CPU connected with the 7th pin of the OP amplifier U3B will check the stabilized high potential and judges the charging voltage being normal, with the charge pinchers pinching tightly correct poles, and then charging operation will be started.

On the contrary, if the voltage fed out of the OP amplifier U3B is lower than the preset value or the potential is not stable, the CPU will detect a low potential or pulse, and stop charging operation at once. For example, under charging condition, if the charge pincher(s) is (are) removed or falls off by accident, a pulse will appear at the 7th pin of the OP amplifier U3B, as the SCR is operating to feed all wave voltage to the input pin of the OP amplifier U3B. Thus, the OP amplifier U3B feeds voltage to the battery, and also feeds to the CPU, which then checks it to be high or low potential or pulse and then decides accordingly to start or stop charging operation.

In using, the positive and the negative of the charging circuit are respectively connected to those of a battery to be charged, the phase inverting amplifier of the OP amplifier U3B of the voltage checking circuit 7 inverts the phase and amplifies voltage fed from the negative of the charging circuit, and sends it to the CPU for checking and protecting safety before and during charging operation. For example, if the stored electric volume of the battery is less than a quarter (e.g. the battery already damaged), if the positive and the negative of the charging circuit are reversely connected with those of the battery, or if pinchers of the positive and the negative of the charging circuit contact each other in a short-circuited condition or fall off the poles of the battery, the output pin of the OP amplifier U3B is low potential, and the CPU at once stops charging operation, with a light emitting diode LED1 flickering to indicate an irregularity.

If charging operation is normal, with the battery being all right, the output pin of the OP amplifier U3B is high potential, and the CPU will start charging operation within five minutes, letting a light emitting diode LED3 flicker to indicate charging started.

In charging, the light emitting diode LED3 flickers once every 0.5 second, indicating charging operation enter the first equalizing charge mode, wherein the CPU has one of its output ports RA2, RB5 in high potential, setting an equalizing charge voltage to be fed to the comparator U2C as charging voltage. Meanwhile, the charging circuit feeds high voltage to the battery first, and gradually lowers voltage, and for 12 V batteries, the equalizing charge mode will begin with 14.3 V for charging and gradually lower it.

Further, in charging, the comparator U3A readily gets voltage of the battery from the voltage control circuit 4, and when it rises to a certain reference value, the output pin of the comparator U3A is high potential, and the CPU automatically counts the time for 2–5 hours and after those hours alters the first equalizing charge mode into the second floating charge mode.

In the second floating charge mode, the two output ports RA2, RB5 of the CPU exchange voltage, keeping the floating charge condition with a certain voltage to the battery. Under this condition, there is charging voltage but no current (for 12 V batteries, the floating charge voltage is 13.5 V or so), keeping on charging the battery to let it have a definite stored electric volume, with the light emitting diode LED3 flickering by the CPU to indicate the charging operation being in the second floating charge mode.

In addition, a user can use the push button SW1 connected to the input port RB4 of th CPU for selecting the first equalizing charge mode or the second floating charge mode, or a charging current value. For example, pushing the button SW1 for 5 seconds or so can alter the first equalizing charge mode into the second floating charge mode, or vice versa. Pushing the button for 1 second can select a charging current value.

The charging circuit in the invention has the following advantages, as can be understood from the aforesaid description.

1. The charging circuit can be simplified by coordinating the CPU with the inner program with operation of the various circuits, supplying a proper constant voltage and a proper constant current in due time to the voltage control circuit 4 and the current control circuit 5.
2. The charging circuit and a battery being charged can be protected by immediate stop of charging by means of the CPU coordinated with the voltage checking circuit 7, if the battery may have any irregularity during charging operation. An irregularity may be the stored electric volume of a battery being less than a quarter (e.g. the battery already damaged), the positive and the negative of the charging circuit being connected reversely with those of the battery, the pinchers of the positive and the negative of the charging circuit contacting each other in a short-circuited condition, or the pinchers falling off the terminals of the battery, etc.

3. The two stages of the charging modes can be selected by the CPU coordinated with the detection of the various circuits. The first mode is an equalizing charge mode with high voltage, and the second mode is a floating charge mode to keep a definite stored electric volume in the battery, preventing the battery from damaged by non-stop charging with high voltage, and possible to keep a definite stored electric volume in the battery.

4. The push button SW1 can be used manually to select the equalizing charge mode or the floating charge mode, or a charging current value.

What is claimed is:

1. A charging circuit comprising a power circuit, a drive circuit, a PWM circuit, a voltage control circuit, a current control circuit, a central control circuit and a voltage checking circuit;

said power circuit rectifying power and filtering wave and stabilizing voltage to be supplied to the other circuits;

said drive circuit consisting of transformer having a charging negative formed at a center point of its coil, two ouputs of said transformer respectively connected to A pins of two silicon-controlled rectifiers, K pins of said two rectifiers connected with each other and then connected with a shunt to act as a charging positive, trigger pins of said two silicon-controlled rectifiers connected to the emitter of a transistor Q3, the collector of said transistor Q3 connected with said power circuit, the base of said transistor Q3 connected to the output of said PWM circuit;

said PWM circuit consisting of an amplifier U2A for amplifying output signal of said voltage control circuit and feeding it to a comparator U2B as a DC level, a standard triangle wave fed to another input of said comparator U2B, the output of said comparator U2B connected to the base of said transistor Q3;

characterized by said voltage control circuit having an OP amplifier U2D for fading the voltage at the input charging negative and then feeding it to a comparator U2C for comparing it with that at its pin, said compared value fed to the input of said amplifier U2A of said PWM circuit for adjusting and stabilizing the output voltge of said charging circuit;

said current control circuit having an OP amplifier U3C as a differential amplifier for amplifying the current of said shunt of said drive circuit, said amplified circuit faded by two resistors R11, r13 and then fed to a comparator U3D, the output of said comparator U3D connected to the output of another comparator U2C via a diode D3, said OP amplifier U3B amplifying the current of said shunt and feeding it to said comparator U3D for comparison with the constant current, said comparator U3D having a high output, the negative of said diode D3 having a higher voltage than the positive in case of the normal output current not exceeding the constant current, thus the voltage of said comparator U2C fed to said amplifier U2A being not affected, the output of said comparator U3D being low potential and the positive voltage of said diode D3 being higher than that of the negative to make said diode ON in case of said current exceeding the constant current, thus the voltage of said comparator U2C fed to said amplifier U2A becoming lower to alter the output charging voltage and thus obtaining function of fixing a constant current;

said central control circuit having a CPU for controlling charging operation in coordination with an inner program, dividing the charging operation into two stages of a first equalizing charge and a second floating charge, the output port of said CPU supplying the constant voltage to said comparator U2C of said voltage control circuit and the constant current to said comparator U3D of said current control circuit; and said voltage checking circuit having an OP amplifier U3B as a phase invert amplifier, inverting phase and amplifying the voltage of the input charging negative, said phase inverting amplifier of said OP amplifier U3B having its output being low potential and said CPU stopping at once charging operation so as to protect said charging circuit and a battery being charged in case of any irregularity occurring in charging operation, said OP amplifier U3B having its output being high potential and said CPU keeping on normal and no irregularity.

2. The charging circuit as claimed in claim 1, wherein the constant current at the input of said comparator U3D of said current control circuit is controlled by said CPU, the input of said comparator U3D is connected in parallel to voltage dividing resistors (R16, R25, R40) and connected to a connect pin of said CPU, the constant current can be altered if the divided voltage value of the input of said comparator U3D is altered, the resistors R40 and R25 are in parallel if the connect pin of the CPU is low potential, thus the input voltage value of said comparator U3D can be altered, and the constant current of different value can be controlled by said CPU feeding high or low potential in coordination with said voltage dividing resistors.

3. The charging circuit as claimed in claim 1, wherein the input port RAO of said CPU is connected to the output of said comparator U3A, the charging mode is the equalizing charge of the first stage at the beginning, said comparator U3A gets the voltage of a battery from the output of said OP amplifier U2D of said voltage control circuit and compares it with the reference voltage got from the voltage dividing circuit (formed of said resistors R37 and R32), the output of said comparator U3A is high potential when the voltage of the battery rises to the reference voltage, and said CPU automatically counts the time for several hours and keeps on charging operation and alters the equalizing charge mode into the floating charge mode after the several hours, lowering the constant voltage fed to said comparator U2C and keeping on the floating charge to the battery.

4. The charging circuit as claimed in claim 1, wherein a push button SW1 is connected to the input port of said CPU for selecting manually the equalizing charge mode or the floating charge mode or a charging current value, in coordination with the inner program.

5. The charging circuit as claimed in claim 1, wherein said voltage checking circuit performs detecting irregularities in charging operation by means of sadi OP amplifier feeding voltage to the positive and the negative of a battery first, the connect pin of said CPU is to be checked to have a stable high potential when said OP amplifier U3B feeds voltage higher than the preset value and maintains a stable level, charging operation will be started if the charging voltage is checked to be normal and if charging pinchers pinch correctly right polarity, said CPU will stop charging operation if said OP amplifier U3B has its output voltage lower than the preset value or unstable potential and said CPU detects lower potential or pulse, and said OP amplifier checks the input voltage of the battery and feeds it to said CPU, which then judges it to be high or low potential or pulse and decides whether to start or stop charging operation.

* * * * *